(12) United States Patent
Chang

(10) Patent No.: US 9,789,550 B2
(45) Date of Patent: Oct. 17, 2017

(54) BLADE POSITIONING STRUCTURE OF DISPOSABLE MILLING CUTTER

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 170 days.

(21) Appl. No.: 14/661,125

(22) Filed: Mar. 18, 2015

(65) Prior Publication Data

US 2016/0023286 A1    Jan. 28, 2016

(30) Foreign Application Priority Data

Jul. 28, 2014    (TW) .............................. 103125623 A

(51) Int. Cl.
| | | |
|---|---|---|
| B23C 5/00 | (2006.01) | |
| B23C 5/22 | (2006.01) | |
| B23C 5/08 | (2006.01) | |
| B23C 5/10 | (2006.01) | |
| B23B 27/04 | (2006.01) | |
| B23B 27/08 | (2006.01) | |
| B23B 27/16 | (2006.01) | |
| B23B 29/04 | (2006.01) | |

(52) U.S. Cl.
CPC ............ *B23C 5/2204* (2013.01); *B23B 27/04* (2013.01); *B23B 27/08* (2013.01); *B23B 27/1614* (2013.01); *B23B 27/1622* (2013.01); *B23B 29/043* (2013.01); *B23C 5/08* (2013.01); *B23C 5/109* (2013.01); *B23C 5/1072* (2013.01); *B23C 5/2213* (2013.01); *B23C 5/2221* (2013.01); *B23B 2200/086* (2013.01); *B23B 2200/161* (2013.01); *B23B 2200/165* (2013.01); *B23B 2205/12* (2013.01); *B23C 2200/081* (2013.01); *B23C 2200/161* (2013.01); *B23C 2200/362* (2013.01); *B23C 2210/168* (2013.01)

(58) Field of Classification Search
CPC ........ B23C 2210/161; B23C 2210/165; B23C 2200/161; B23C 2200/082; B23B 2200/161; B23B 2200/082
See application file for complete search history.

(56) References Cited

U.S. PATENT DOCUMENTS

| | | | | |
|---|---|---|---|---|
| 5,542,795 A | * | 8/1996 | Mitchell | ............... B23C 5/2221 407/35 |
| 9,120,154 B2 | * | 9/2015 | Hecht | ................. B23B 27/1622 |
| 2002/0037199 A1 | * | 3/2002 | Satran | ................... B23C 5/1045 407/54 |
| 2005/0117981 A1 | * | 6/2005 | Satran | ....................... B23C 5/08 407/117 |
| 2007/0160431 A1 | * | 7/2007 | Pantzar | ................. B23C 5/2213 407/67 |

(Continued)

*Primary Examiner* — Will Fridie, Jr.
(74) *Attorney, Agent, or Firm* — Rosenberg, Klein & Lee

(57) ABSTRACT

A blade positioning structure of a disposable milling cutter includes a cutter body and a disposable blade. The cutter body is peripherally provided with a blade seat. By passing a screw through the disposable blade and the blade seat, the disposable blade is locked to the blade seat. The blade seat has a blade seat surface and a sidewall; the blade seat surface has a groove; the disposable blade has a bottom surface provided with a projection corresponding in shape to the groove; and when the disposable blade is locked to the blade seat, the blade seat surface and the groove of the latter lie respectively and tightly against the bottom surface and the projection of the former.

6 Claims, 11 Drawing Sheets

(56) References Cited

U.S. PATENT DOCUMENTS

| | | | |
|---|---|---|---|
| 2012/0014758 A1* | 1/2012 | Hall | B23C 5/08 407/43 |
| 2014/0030038 A1* | 1/2014 | Hansson | B23C 5/2221 408/199 |
| 2014/0086696 A1* | 3/2014 | Fang | B23C 5/2221 407/99 |
| 2015/0158090 A1* | 6/2015 | Hecht | B23B 27/16 407/113 |
| 2015/0251255 A1* | 9/2015 | Lee | B23C 5/08 407/48 |
| 2015/0273590 A1* | 10/2015 | Muthuswamy | B23B 27/145 407/66 |
| 2015/0336187 A1* | 11/2015 | Choi | B23C 5/06 407/48 |
| 2016/0023286 A1* | 1/2016 | Chang | B23C 5/08 407/48 |
| 2016/0023287 A1* | 1/2016 | Chang | B23C 5/2239 407/48 |
| 2016/0207124 A1* | 7/2016 | Brown | B23C 5/207 |

* cited by examiner

BLADE POSITIONING STRUCTURE OF DISPOSABLE MILLING CUTTER

FIELD OF THE INVENTION

The present invention relates to the blade positioning structure of a disposable milling cutter. More particularly, the present invention relates to a novel structure for locking disposable blades to the blade seats of a disposable milling cutter, wherein the structure helps increase the number of effective cutting edges of the disposable milling cutter in order to enhance cutting efficiency and cut costs.

BACKGROUND OF THE INVENTION

Please refer to FIG. 11 and FIG. 12 respectively for a conventional T-slot cutter 80 and a conventional side milling cutter 90, both with soldered blades. These milling cutters 80, 90 are multi-point cutting tools designed mainly for forming T slots or other types of grooves. A traditional T-slot cutter or side milling cutter typically has soldered blades, which are soldered to the body of the cutter with copper as the soldering material. Such T-slot cutters and side milling cutters feature low rotation speeds, but their multiple cutting edges contribute to high chip removal rates. Nowadays, the most common blade materials are high-speed steel (HSS) and tungsten carbide (WC). HSS has a hardness of HRC 66~68 and can withstand temperatures as high as 600° C. However, HSS blades tend to lower both processing speed and feed speed and therefore give way to WC blades when high processing speed is desired. WC cutters are harder and can tolerate higher temperatures than their HSS counterparts, and yet a milling cutter with soldered WC blades cannot be coated in a typical coating environment, whose temperature ranges from 300° C. to 800° C., for the copper used to solder the WC blades to the milling cutter will soften at about 300° C.~400° C. This explains why milling cutters with soldered WC blades cannot be coated with titanium, and the lack of this titanium coating hinders further improvement of such milling cutters in hardness, wear resistance, and temperature resistance. Now that cutting speed and feed speed cannot be raised, effective enhancement in processing efficiency is unattainable.

In view of the fact that milling cutters with soldered blades have problem being coated with special metals (e.g., titanium), disposable T-slot cutters and side milling cutters are called for, whose uses are briefly stated as follows:

T-slot cutters: Conventional disposable T-slot cutters have an outer diameter of about 21~50 mm. Referring to FIG. 13, the conventional disposable T-slot cutter 50 has an outer diameter D1 of 50 mm and four disposable blades 51, wherein each two adjacent disposable blades 51 (e.g., the disposable blades 51a and 51b) are positioned in a staggered arrangement (i.e., not aligned with each other), thus jointly forming an effective cutting edge with a cutting edge width W1 extending in an axial direction X1. In other words, each effective cutting edge of the disposable T-slot cutter 50 is defined by two adjacent disposable blades 51 (e.g., the disposable blades 51a and 51b). Hence, the number of the effective cutting edges of the disposable T-slot cutter 50 (i.e., two) is only half of the number of its disposable blades 51. By the same token, if a conventional disposable T-slot cutter with an outer diameter of 21 mm has two disposable blades, there will be only one effective cutting edge. In the case of a T-slot cutter with soldered blades, however, each blade forms an effective cutting edge (See FIG. 11). That is to say, a T-slot cutter with soldered blades has as many effective cutting edges as its blades.

According to the above, given the same number of blades, the number $Z_C$ of the effective cutting edges of a disposable T-slot cutter is only half of that of a T-slot cutter with soldered blades. Since the feed speed $V_f$ of a milling machine is in direct proportion to the number $Z_C$ of effective cutting edges ($V_f = f_z \times N \times Z_C$, wherein $V_f$ is feed speed of a milling machine, $f_z$ is feeding amount of each effective cutting edge, N is the number of revolutions of the main shaft per unit time, and $Z_C$ is the number of effective cutting edges), a disposable T-slot cutter does not provide a significant increase in cutting efficiency as compared with a T-slot cutter with soldered blades. Apart from that, given the same cutting conditions (e.g., high speed and heavy-duty cutting), the shaft of a disposable T-slot cutter is more likely to undergo noticeable deflection than the shaft of a T-slot cutter with soldered blades. The deflection not only impairs the precision of cutting but also shortens the service lives of the affected cutters.

Side milling cutters: Conventional three-face disposable side milling cutters have an outer diameter of about 100~160 mm. Referring to FIG. 14, the conventional disposable side milling cutter 60 has an outer diameter D2 of 160 mm and ten disposable blades 61, wherein each two adjacent disposable blades 61 (e.g., the disposable blades 61a and 61b) are positioned in a staggered arrangement (i.e., not aligned with each other) and thus jointly form an effective cutting edge with a cutting edge width W2 extending in an axial direction X2. In other words, each effective cutting edge of the disposable side milling cutter 60 is defined by two adjacent disposable blades 61 (e.g., the disposable blades 61a and 61b). Therefore, the number of the effective cutting edges of the disposable side milling cutter 60 (i.e., five) is only half of the number of its disposable blades 61. By contrast, a side milling cutter with the same number of soldered blades has ten effective cutting edges. That is to say, the number of the effective cutting edges of a disposable side milling cutter is only half of that of a side milling cutter with the same number of soldered blades. Consequently, a disposable side milling cutter does not provide a significant increase in cutting efficiency as compared with a side milling cutter with soldered blades.

The main reason why the number of the effective cutting edges of a disposable T-slot cutter or disposable side milling cutter cannot be increased lies in the positioning structure of the disposable blades 51, 61. More specifically, referring to FIG. 14, each disposable blade 61 requires not only to be locked to a blade seat 62 of the disposable side milling cutter 60 by a screw 30, but also to be supported by the two perpendicularly connected sidewalls 621 and 622 of the blade seat 62 in order to resist great cutting stresses, which otherwise will be borne by the screw 30 alone. If, referring to FIG. 15, each disposable blade 61 is held in place by the locking force of the screw 30 and the supporting force of only one sidewall 621, the maximum cutting stress each disposable blade 61 can cope with will be lowered considerably. As each blade seat 62 of the conventional disposable side milling cutter 60 must have two sidewalls 621 and 622 connected at an angle of 90 degrees, the number of the effective cutting edges of the cutter is reduced. It is this conventional blade positioning design that keeps the cutting efficiency of disposable T-slot cutters and disposable side milling cutters from betterment.

SUMMARY OF THE INVENTION

To solve the aforesaid problems of the conventional disposable T-slot cutters and disposable side milling cutters—namely the relatively few effective cutting edges and relatively low cutting efficiency, both resulting from the conventional structure for locking disposable blades—the present invention provides a blade positioning structure of a disposable milling cutter as disclosed herein. The disposable milling cutter includes a cutter body and a disposable blade. The cutter body has an outer periphery provided with a blade seat. The blade seat extends transversely through the cutter body and has a threaded hole. The disposable blade is penetrated by a screw hole and can be locked to the blade seat by passing a screw through the screw hole and the threaded hole. The blade positioning structure is characterized in that: the blade seat has a blade seat surface and a sidewall; the blade seat surface is provided with at least one groove; the disposable blade has a bottom surface provided with a projection corresponding in shape to the groove in the blade seat surface; and when the disposable blade is locked to the blade seat, the blade seat surface and the groove of the blade seat lie respectively and tightly against the bottom surface and the projection of the disposable blade.

As the disposable blade of the present invention is provided with a projection corresponding to the groove of the blade seat, the groove (e.g., a curved groove) can guide the projection (e.g., a curved projection) of the disposable blade when the disposable blade is placed on the blade seat, allowing the projection to slide rapidly into the groove and thereby complete the positioning the disposable blade swiftly. Since the projection and the groove lie against each other very tightly, a double-face contact exists between the disposable blade and the blade seat in the vertical direction, and the degree of freedom of the disposable blade is limited also in the horizontal direction. Once the disposable blade and the blade seat are locked together with a screw, the milling cutter is enhanced in rigidity and is prevented from vibration during cutting. Thus, by changing the conventional blade positioning design, in which each two adjacent disposable blades must be arranged in a staggered arrangement, the present invention increases the effective cutting edges of a disposable milling cutter and consequently improves the cutting efficiency of the milling cutter.

BRIEF DESCRIPTION OF THE DRAWINGS

The invention as well as a preferred mode of use and the advantages thereof will be best understood by referring to the following detailed description of some illustrative embodiments in conjunction with the accompanying drawings, in which.

DETAILED DESCRIPTION OF THE INVENTION

Figure 2:
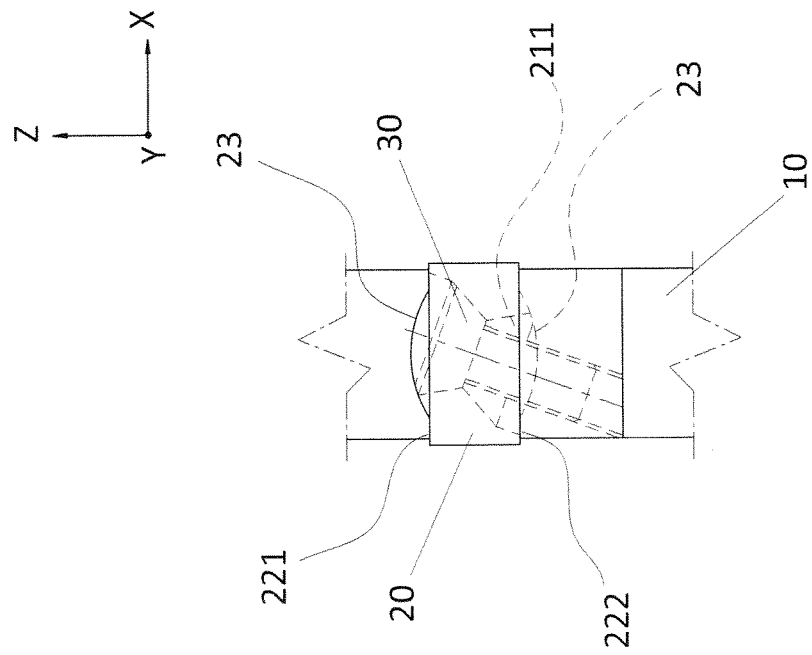
FIG. 2 is a partial side view of an embodiment of the present invention.
Figure 1:
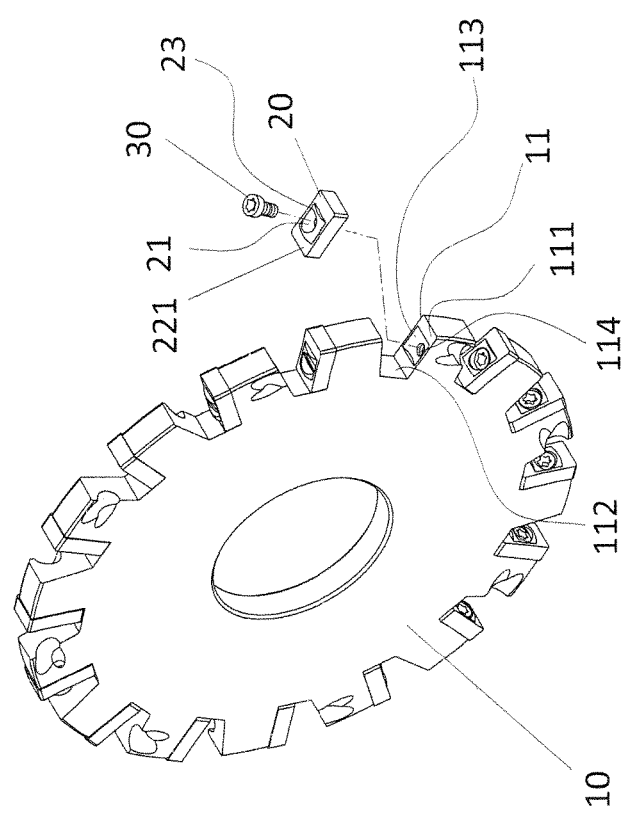
FIG. 1 is a perspective view of an embodiment of the present invention.

FIG. 1 and FIG. 2 illustrate the blade positioning structure of a disposable milling cutter according to an embodiment of the present invention, wherein the disposable milling cutter includes a cutter body 10 and a plurality of disposable blades 20.

The cutter body 10 has an outer periphery provided with a plurality of blade seats 11. Each blade seat 11 extends transversely through (i.e., through the thickness, or width, of) the cutter body 10 and has a blade seat surface 111 and a sidewall 112.

Each blade seat surface 111 is provided with a curved groove 113 and a threaded hole 114.

The disposable blades 20 are provided at the blade seats 11 of the cutter body 10 respectively. For the sake of simplicity, the blade positioning structure of the present invention is detailed hereinafter with reference to only one disposable blade 20 and one blade seat 11 by way of example.

In this embodiment, the disposable blade 20 has a bottom surface 222 provided with a curved projection 23, wherein the shape of the curved projection 23 corresponds to that of the curved groove 113 of the blade seat 11. Also, the disposable blade 20 is penetrated by a screw hole 21, which is aligned with the threaded hole 114 in the blade seat surface 111 of the blade seat 11 so that a screw 30 can pass sequentially through the screw hole 21 and the threaded hole 114 and thereby lock the disposable blade 20 to the cutter body 10. Preferably, the screw hole 21 of the disposable blade 20 includes a countersunk hole 211 at each of its two ends.

As previously mentioned, the curved projection 23 of the disposable blade 20 corresponds in shape to the curved groove 113 of the blade seat 11. Therefore, in the course in which the disposable blade 20 is mounted to the blade seat 11, the curved projection 23 on the bottom surface 222 of the disposable blade 20 is guided by and thus slides rapidly into the curved groove 113 of the blade seat 11; as a result, the positioning of the disposable blade 20 is completed promptly. The disposable blade 20 preferably has a top surface 221 provided with another curved projection 23 so that, when it is necessary to turn the disposable blade 20 over in order to use an unused cutting edge instead of the one that is already worn, the curved projection 23 on the top surface 221 will also be guided by and slide swiftly into the curved groove 113 of the blade seat 11 to help position the disposable blade 20 rapidly. Once the positioning process is completed, the disposable blade 20 is locked to the blade seat 11 with the screw 30 to press the curved projection 23 of the disposable blade 20 tightly against the curved groove 113 of the blade seat 11, and the bottom surface 222 (or top surface 221) of the disposable blade 20 tightly against the blade seat surface 111 of the blade seat 11.

As shown in FIG. 2, the bottom surface 222 (or top surface 221) and the curved projection 23 of the disposable blade 20 are in contact with the blade seat surface 111 and the curved groove 113 of the blade seat 11 respectively. In consequence, a double-face contact exists between the disposable blade 20 and the blade seat 11 in the vertical direction (i.e., the Z-axis direction) and limits the degree of freedom of the disposable blade 20 in the vertical direction (i.e., the Z-axis direction).

Figure 3:
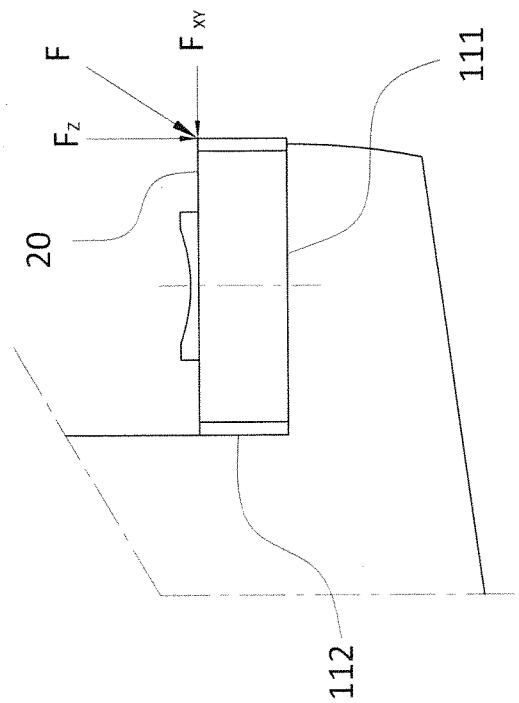
FIG. 3 is a schematic assembled view of a curved projection and a curved groove in an embodiment of the present invention.

Moreover, referring to FIG. 3, as the contact surface between the curved projection 23 of the disposable blade 20 and the curved groove 113 of the blade seat 11 is a curved one, the contact force acting on which can be divided into a horizontal component and a vertical component, the degree of freedom of the disposable blade 20 is limited in the horizontal direction (i.e., the X-Y plane direction) as well as in the vertical direction (i.e., the Z-axis direction). In particular, when the disposable blade 20 is tightly locked to the blade seat 11 by the screw 30 (see FIG. 2), the degree of freedom of the disposable blade 20 is further limited in the horizontal direction (i.e., the X-Y plane direction), or more specifically in both X-axis and Y-axis directions, preventing the disposable blade 20 from moving or vibrating under cutting stress.

Figure 4:
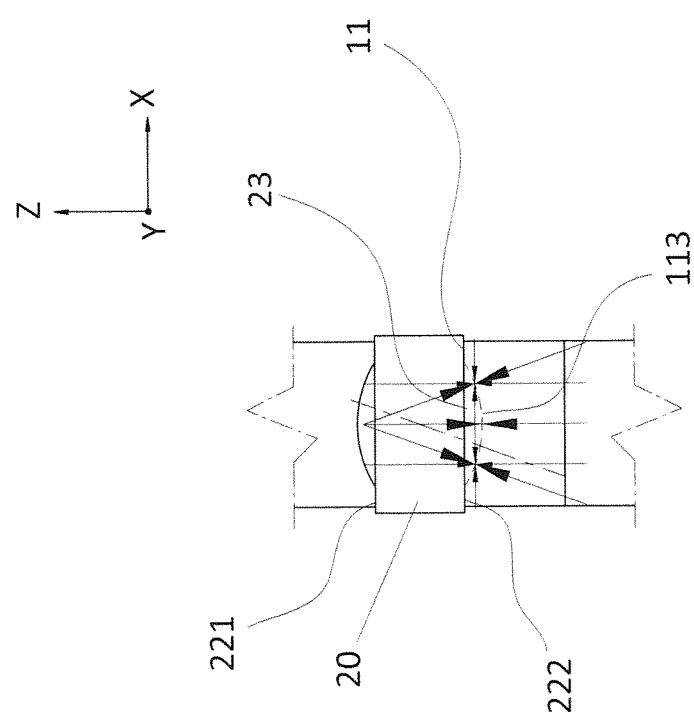
FIG. 4 is a partial assembled front view of a disposable blade and a blade seat in an embodiment of the present invention.

Referring to FIG. 4, when the disposable blade 20 is subjected to a cutting stress F, the horizontal component $F_{XY}$ of the cutting stress F is borne by the sidewall 112 of the blade seat 11, and the vertical component $F_Z$ of the cutting stress F is borne by the blade seat surface 111 of the blade seat 11.

Thus, once the disposable blade 20 is tightly locked to the blade seat 11, the degree of freedom of the disposable blade 20 is limited in all three axial directions, allowing cutting stress to be transmitted smoothly, and the stability of the cutter is enhanced as a result.

Figure 6:
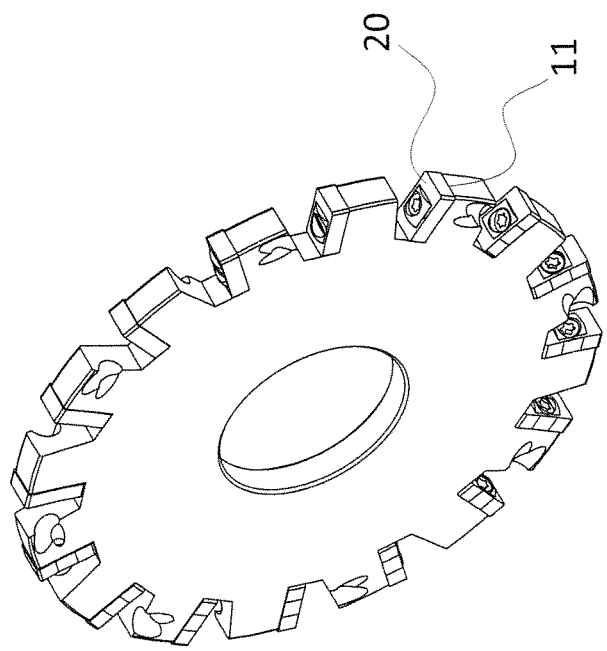
FIG. 6 is a perspective view of a disposable side milling cutter employing an embodiment of the present invention.
Figure 5:
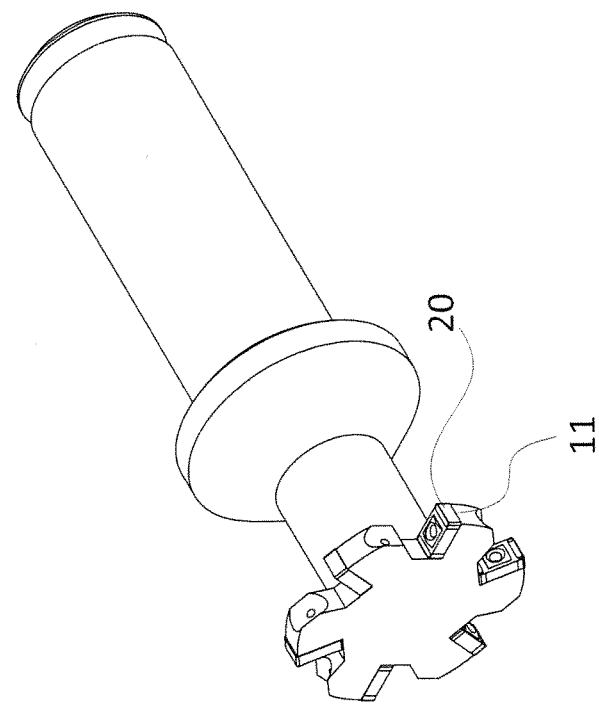
FIG. 5 is a perspective view of a disposable T-slot cutter employing an embodiment of the present invention.
Figure 7:
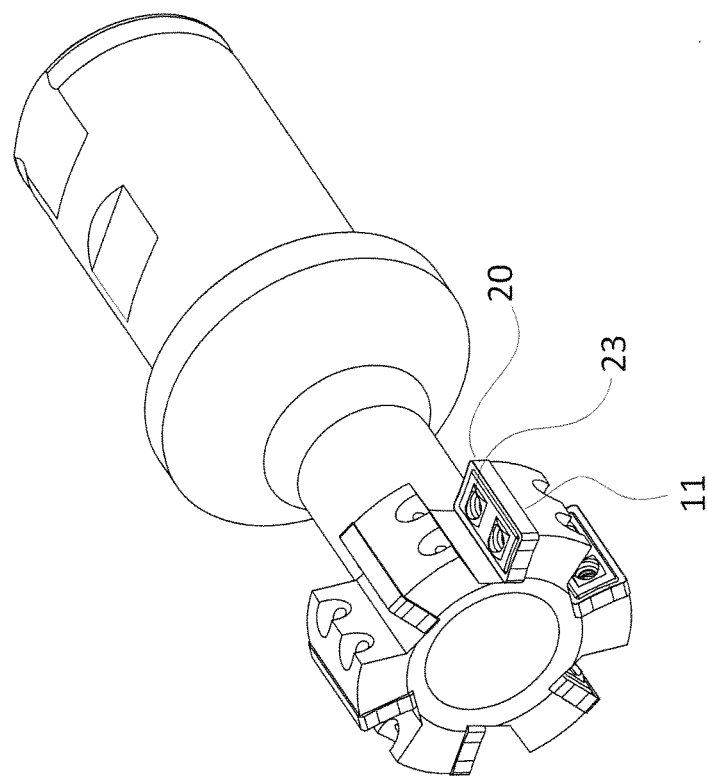
FIG. 7 is a perspective view of another disposable T-slot cutter employing an embodiment of the present invention.

FIG. 5 and FIG. 6 show an application example in which the blade positioning structure of the present invention is applied to a disposable T-slot cutter and a disposable side milling cutter. In this application example, the disposable blades 20 can be as wide as the blade seats 11 due to the fact that the blade seats 11 of the disposable T-slot cutter and of the side milling cutter do not require two sidewalls. The disposable blades 20 can be even wider to suit the widths of the grooves to be cut. Or the disposable blades 20 and the blade seats 11 can both be widened, as shown in FIG. 7, with each disposable blade 20 provided with an appropriate number of curved projections 23, and each blade seat 11, with the corresponding number of curved grooves 113 (in this application example, but without limitation, each disposable blade 20 is provided with two curved projections 23, and each blade seat 11 is provided with two curved grooves 113) in order to increase the maximum tolerable cutting stress, and hence the cutting power, of the disposable blades 20.

Figure 8:
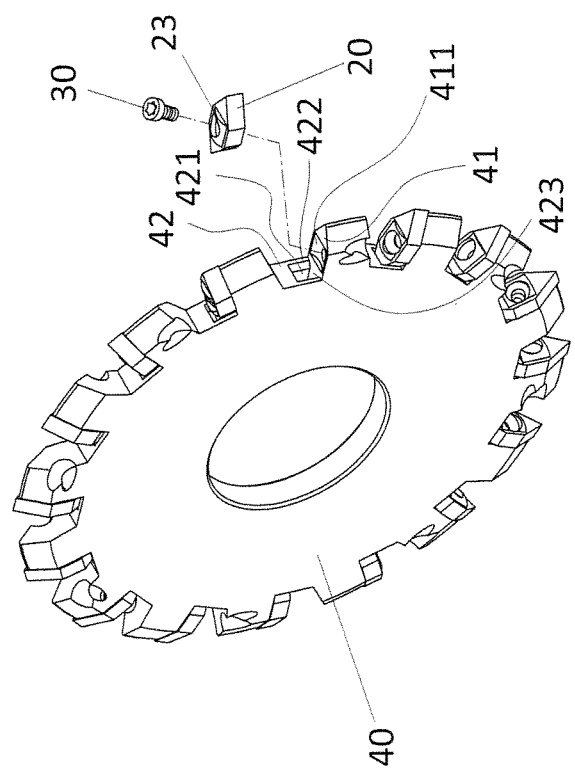
FIG. 8 is a perspective view of another disposable side milling cutter employing an embodiment of the present invention.

Please refer to FIG. 8 for another application example, in which the blade positioning structure of the present invention is applied to a disposable V-groove cutter 40. The disposable V-groove cutter 40 has a plurality of blade seats 41 and a plurality of disposable blades 20. For the sake of simplicity, the following detailed description refers to only one blade seat 41 and one disposable blade 20 by way of example. The blade seat 41 has a curved groove 411, and the disposable blade 20 has a curved projection 23. The curved groove 411 corresponds in shape to the curved projection 23 so that the curved projection 23 can be guided by and therefore slides rapidly into the curved groove 411 to complete the positioning of the disposable blade 20 without delay. What is special about this application example is that the blade seat 41 of the disposable V-groove cutter 40 further has a V-shaped end and a sidewall 42 provided with an aperture 421. The aperture 421 has two lateral walls each provided with a chamfer 422, and the two chamfers 422 jointly define a V-shaped groove 423. On the other hand, the disposable blade 20 of the disposable V-groove cutter 40 has two V-shaped ends. As the two V-shaped ends of the disposable blade 20, the V-shaped end of the blade seat 41, and the V-shaped groove 423 in the sidewall 42 of the blade seat 41 correspond in shape to one another, the V-shaped groove 423 can receive either V-shaped end of the disposable blade 20 to thereby position the disposable blade 20. Once the disposable blade 20 is positioned at the blade seat 41 of the V-groove cutter 40, the disposable blade 20 can be securely locked to the blade seat 41 with a screw 30 as in the embodiment described above.

Figure 9:
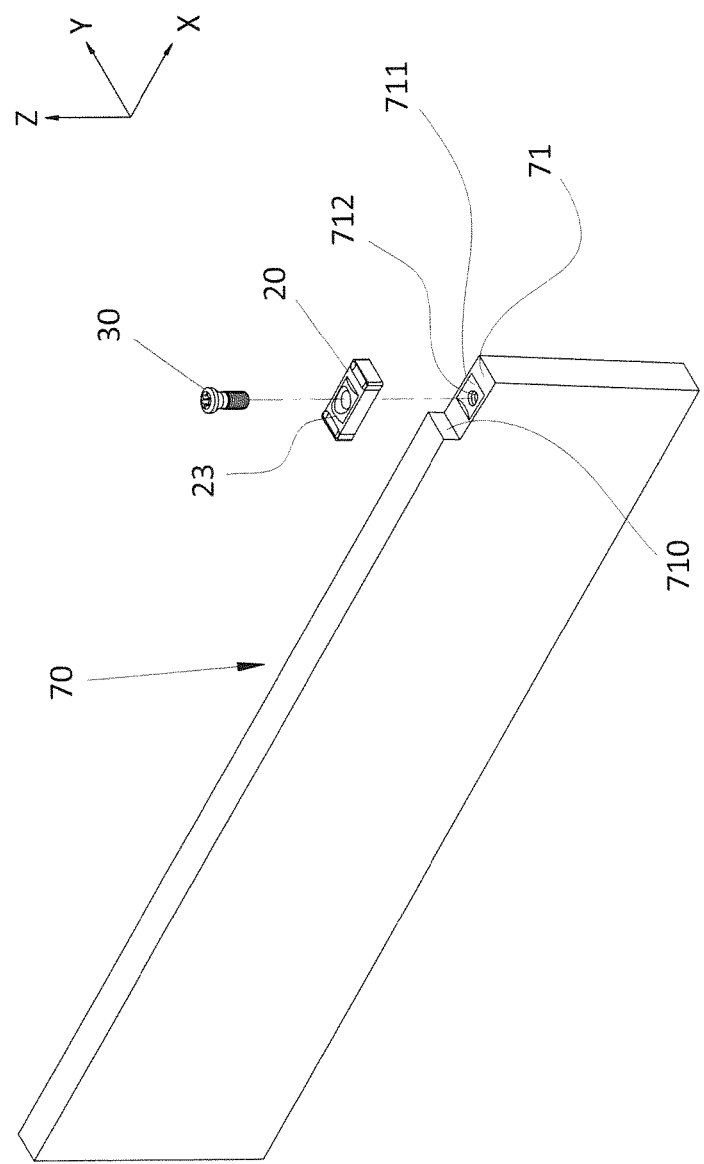
FIG. 9 is a perspective view of a disposable lathe cut-off tool employing an embodiment of the present invention.

FIG. 9 shows yet another application example, in which the blade positioning structure of the present invention is applied to a disposable lathe cut-off tool 70. Like the disposable side milling cutters and disposable T-slot cutters in the foregoing application examples, the disposable cut-off tool 70 has a blade seat 71 with only one sidewall 710. The blade seat 71 is provided with a curved groove 711 and a threaded hole 712 so that a disposable blade 20 can be locked to the blade seat 71 with a screw 30. In addition, due to the curved groove 711 of the blade seat 71, a double-face contact exists between the disposable blade 20 and the blade seat 71 in the vertical direction (i.e., the Z-axis direction) and limits the degree of freedom of the disposable blade 20 in the vertical direction (i.e., the Z-axis direction). As the contact surface between the curved projection 23 of the disposable blade 20 and the curved groove 711 of the blade seat 71 is a curved one, the degree of freedom of the disposable blade 20 is limited in the horizontal direction (i.e., the X-Y plane direction) as well as in the vertical direction (i.e., the Z-axis direction). In particular, when the disposable blade 20 is tightly locked to the blade seat 71 by the screw 30, the degree of freedom of the disposable blade 20 is further limited in the horizontal direction, or more specifically in both X-axis and Y-axis directions, to prevent the disposable blade 20 from moving or vibrating under cutting stress.

Figure 10:
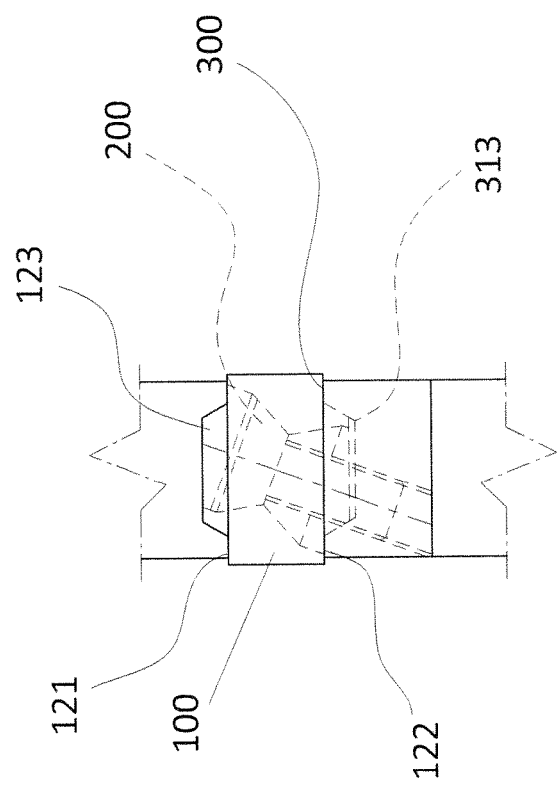
FIG. 10 is a partial side view of another embodiment of the present invention.
Figure 11:
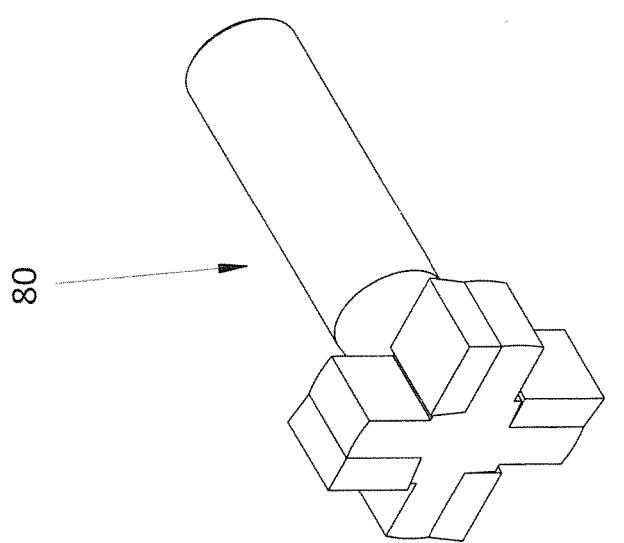
FIG. 11 schematically shows a conventional T-slot cutter with soldered blades.
Figure 12:
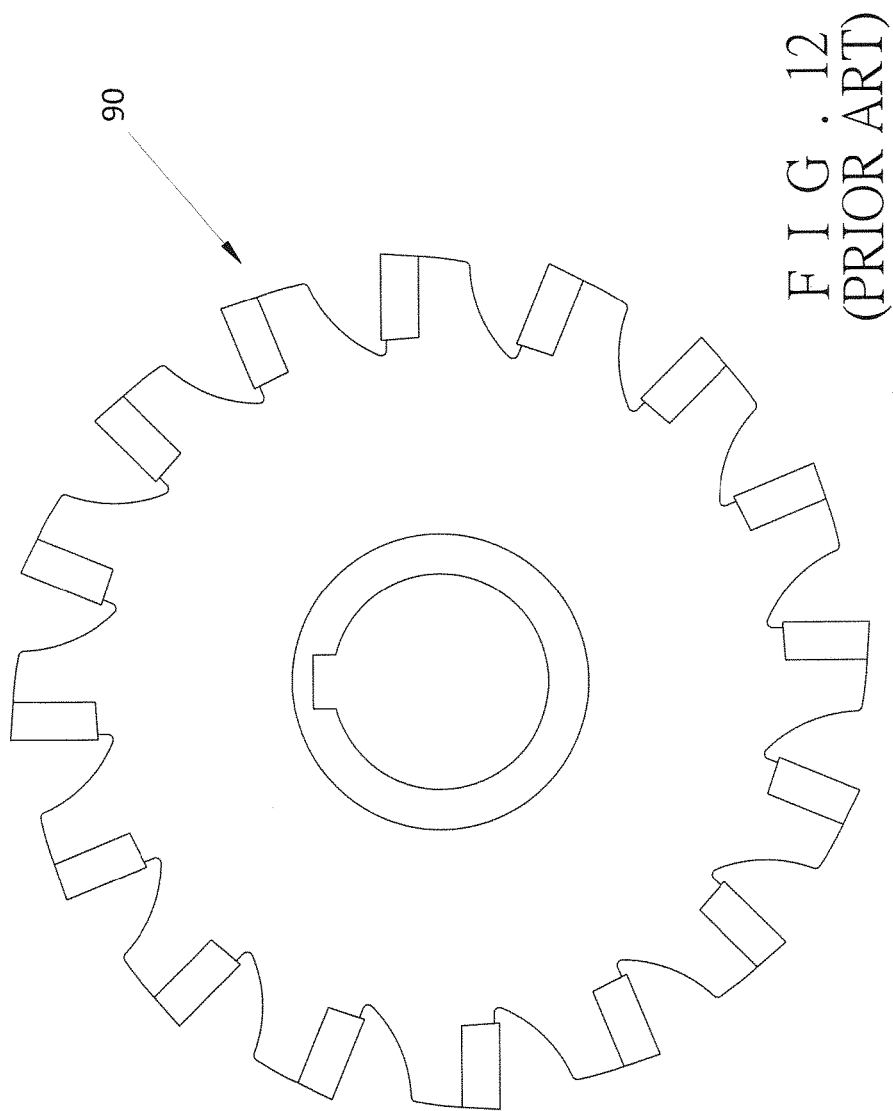
FIG. 12 schematically shows a conventional side milling cutter with soldered blades.
Figure 13:
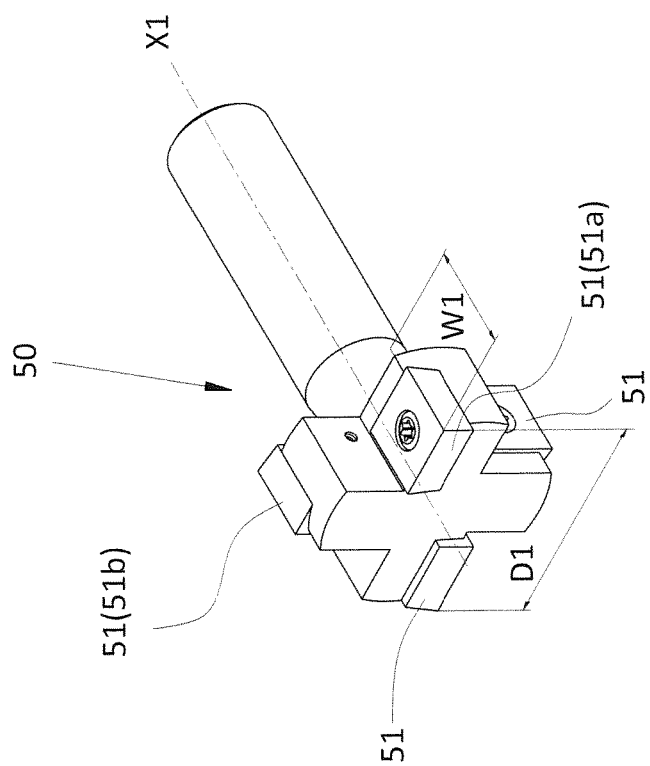
FIG. 13 schematically shows a conventional disposable T-slot cutter.
Figure 14:
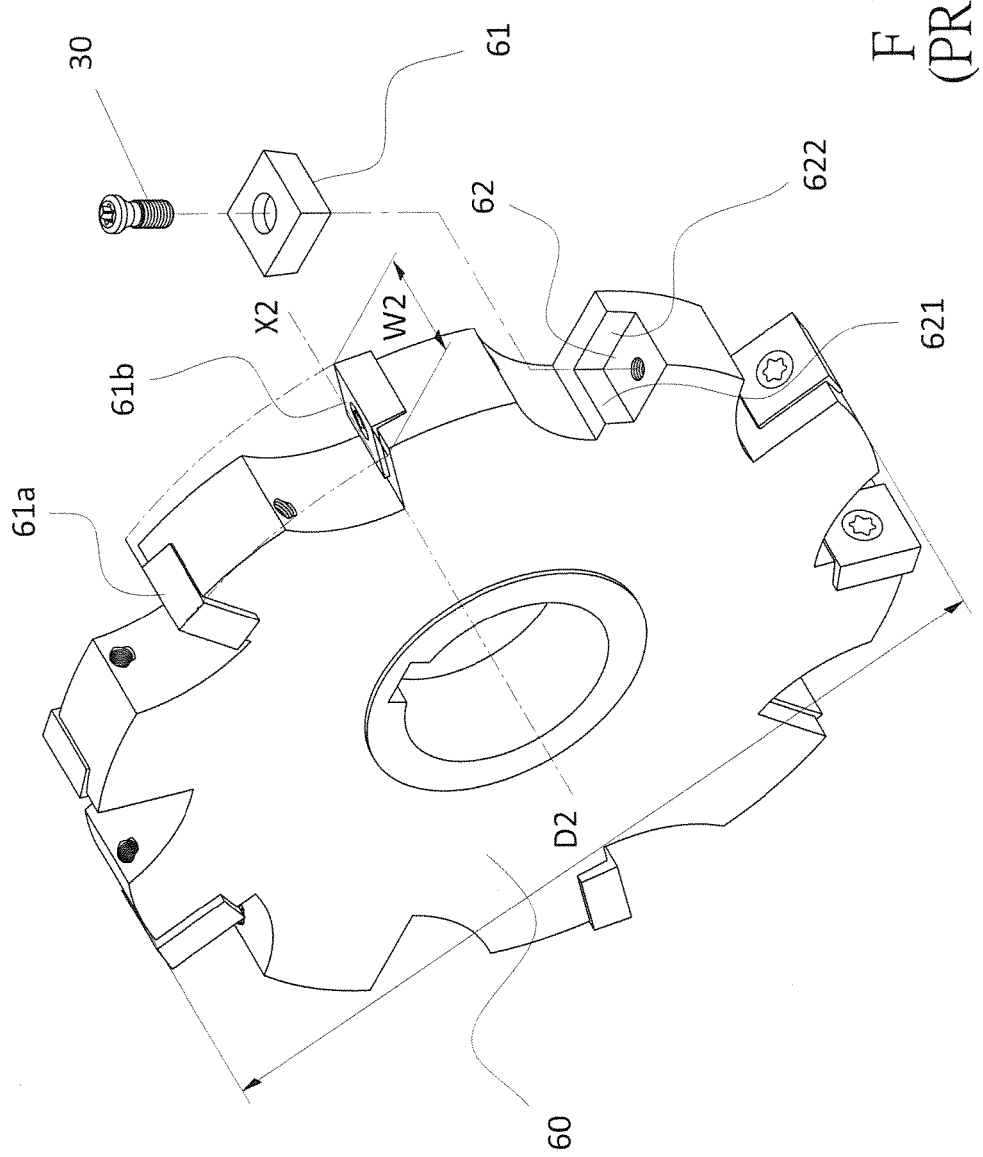
FIG. 14 schematically shows a conventional disposable side milling cutter.
Figure 15:
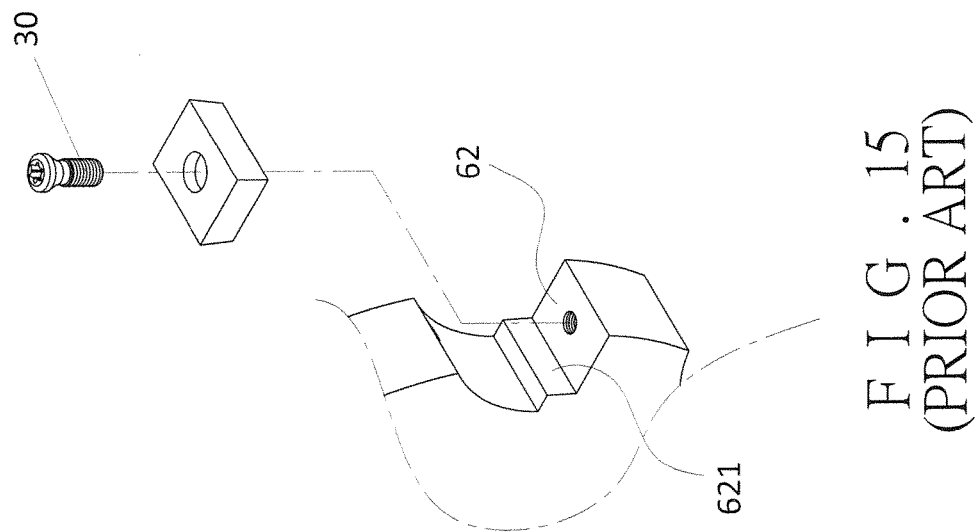
FIG. 15 schematically shows a conventional disposable side milling cutter whose blade seats have one sidewall only.

FIG. 10 shows the blade positioning structure of a disposable milling cutter according to another embodiment of the present invention. In this embodiment, the disposable blade 100 has a top surface 121 and a bottom surface 122 each being provided with a frustum-shaped projection 123, and the blade seat 300 is provided with a frustum-shaped hole 313. Either of the frustum-shaped projections 123 can be received in the frustum-shaped hole 313 of the blade seat 300, and the disposable blade 100 is in position as soon as either frustum-shaped projection 123 is received in the frustum-shaped hole 313 of the blade seat 300. When the disposable blade 100 is subsequently tightly locked to the blade seat 300 with a screw 200, the degree of freedom of the disposable blade 100 is limited in all three axial directions.

According to the above, the top surface and the bottom surface of the disposable blade of the present invention are each provided with a projection corresponding in structure to the groove of the blade seat. Therefore, the blade seat of the disposable milling cutter of the present invention requires only one sidewall, and there is no need for each two adjacent disposable blades to be arranged diagonally (i.e., in a staggered arrangement). As a result, the number of the effective cutting edges of the disposable milling cutter of the present invention is increased in comparison with that which the blade positioning structure of a conventional disposable milling cutter allow. For example, given the same number of blades, the disposable milling cutter of the present invention will have the same number of effective cutting edges as a milling cutter with soldered blades such that both cutting speed and feed speed are increased comparatively, allowing an effective increase in cutting efficiency and the realization of maximum economic benefit. Being the first of its kind in the cutter industry, the structural design disclosed herein is of great novelty and inventiveness.

The invention claimed is:

1. A blade positioning structure of a disposable milling cutter, the disposable milling cutter comprising:
    a cutter body, the cutter body having a pair of opposing planar sides and an outer periphery provided with a blade seat, the blade seat extending transversely through the cutter body and having a threaded hole, the threaded hole being inclined at a first angle relative to the pair of opposing planar sides; and
    a disposable blade, the disposable blade being positioned in the blade seat and penetrated by a screw hole, the screw hole being inclined at a second angle equal to the first angle of the threaded hole to align therewith, and the disposable blade being locked to the blade seat by passing a screw through the screw hole and the threaded hole, the screw being inclined relative to the pair of opposing planar sides of the cutter body thereby;
    wherein the blade seat has a blade seat surface and a sidewall, the blade seat surface being provided with at least one groove;
    wherein the disposable blade has a bottom surface provided with at least one bottom projection and a top surface provided with at least one top projection, each of the bottom projection and the top projection corresponding in shape to the groove in the blade seat surface, said groove in the blade seat surface matingly engageable with either the disposable blade bottom projection or the disposable blade top projection interchangeably; and
    wherein the blade seat surface and the groove of the blade seat lie respectively and tightly against a respective one of the top surface or the bottom surface and the corresponding top or bottom projection of the disposable blade when the disposable blade is locked to the blade seat.

2. The blade positioning structure of claim 1, wherein the number of the at least one groove in the blade seat surface, the number of the bottom projection and the number of the top projection of the disposable blade are set according to a width of the milling cutter.

3. The blade positioning structure of claim 1, wherein the sidewall of the blade seat is provided with an aperture, the aperture has two lateral walls each provided with a chamfer, the two chamfers jointly define a V-shaped groove, and the disposable blade has a V-shaped end corresponding in shape to and receivable in the V-shaped groove.

4. The blade positioning structure of claim 1, wherein the bottom projection and the top projection of the disposable blade are curved projections, and the groove in the blade seat surface is a curved groove.

5. The blade positioning structure of claim 1, wherein the bottom projection and the top projection of the disposable blade are curved projections, and the groove in the blade seat surface is a frustum-shaped hole.

6. The blade positioning structure of claim 4, wherein the curved groove in the blade seat surface is provided at a blade seat of a lathe cut-off tool.

* * * * *